United States Patent [19]

Klinkhardt

[11] Patent Number: 4,575,624

[45] Date of Patent: Mar. 11, 1986

[54] ARRANGEMENT FOR ACTIVATING AND/OR DEACTIVATING A MARKER STRIP HAVING A MAGNETIZABLE LAYER

[75] Inventor: Erhard Klinkhardt, Neuss, Fed. Rep. of Germany

[73] Assignee: Rheinmetall GmbH, Duesseldorf, Fed. Rep. of Germany

[21] Appl. No.: 556,310

[22] Filed: Nov. 30, 1983

[30] Foreign Application Priority Data

Dec. 1, 1982 [DE] Fed. Rep. of Germany ....... 3244431

[51] Int. Cl.[4] .............................................. G06K 7/08
[52] U.S. Cl. .................................... 235/449; 235/493
[58] Field of Search ....................... 235/449, 462, 463; 360/2

[56] References Cited

U.S. PATENT DOCUMENTS

| | | | |
|---|---|---|---|
| 3,869,700 | 3/1975 | Cook | 360/2 |
| 3,929,278 | 12/1975 | Balavoine | 360/2 |
| 4,056,712 | 11/1977 | Trenkamp | 235/449 |
| 4,090,662 | 5/1978 | Fayling | 235/493 |
| 4,304,992 | 12/1981 | Kobayashi | 235/449 |

FOREIGN PATENT DOCUMENTS 1212504  11/1970  United Kingdom ................ 235/462

*Primary Examiner*—Harold I. Pitts

[57] ABSTRACT

A portable device for deactivating and/or activating a magnetizable layer forming part of a marker strip of an antishoplifting system. The device includes an electro-optical reading head for reading specially coded indicia on the marker strip and an A.C. current electro-magnetic coil for producing a magnetic field to deactivate or activate the magnetizable layer of the marker strip. The electro-optical reading head and electro-magnetic coil are mounted in a common portable housing and are connected to a cashier's register.

4 Claims, 3 Drawing Figures

ARRANGEMENT FOR ACTIVATING AND/OR DEACTIVATING A MARKER STRIP HAVING A MAGNETIZABLE LAYER

BACKGROUND OF THE INVENTION

The invention relates to an arrangement for activating and/or deactivating a marker strip having a magnetizable layer and also covers the marker strip proper.

Marker strips having magnetizable components for use in conjunction with detection systems for preventing pilferage and shoplifting in retail stores are known in the art and are, for example, disclosed and described in German published application No. DE-OS No. 29 31 932. There can be imparted onto the magnetizable component (layer) of such a marker strip, for example, reversible characteristics, which characteristics define either an unpaid condition on a piece of merchandise or a properly paid and registered condition on a piece of merchandise. The first mentioned definition corresponds on the magnetizable component (layer) to a so-called "active" marker strip, which after passing through an interrogation zone, releases an alarm. The magnetizable components (layer) of the marker strip are ordinarily not visible because they are covered, whereas the visible surface of the marker strip which is affixed on the product includes advantageously clearly readable indicia and/or a machine-readable pictorial code concerning the product, which code or indicia usually includes the price or the name of the store.

In order to complete the transaction (buying) at the cashier's counter the indicia which are on the marker strip must be read and the magnetizable component (layer) of the marker strip must be deactivated after receipt of the money corresponding to the sales price.

SUMMARY OF THE INVENTION

It is an object of this invention to provide a device which can easily carry out the afore-described functions and can be operated by a sales person in a particularly simple and rational manner.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION

Figure 1:
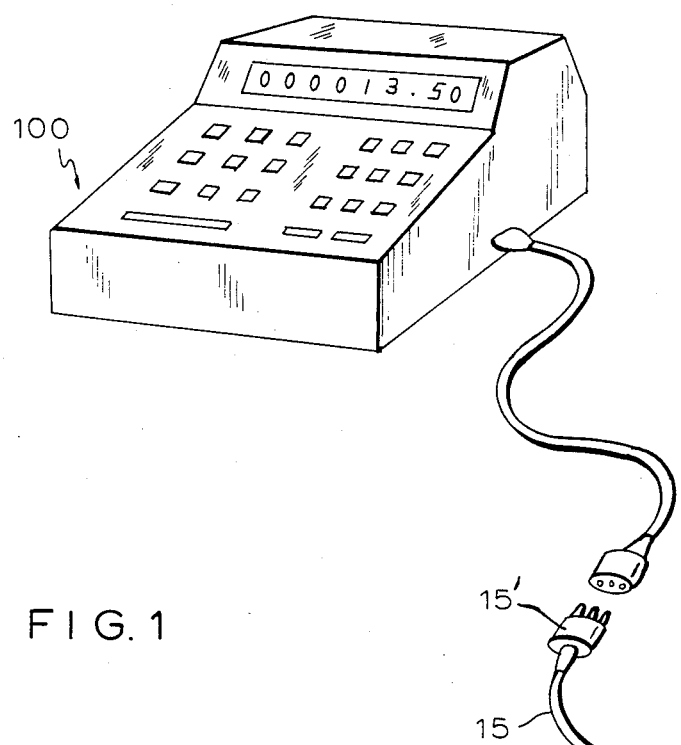
FIG. 1 is a schematic perspective view of the device of this invention.
Figure 1:
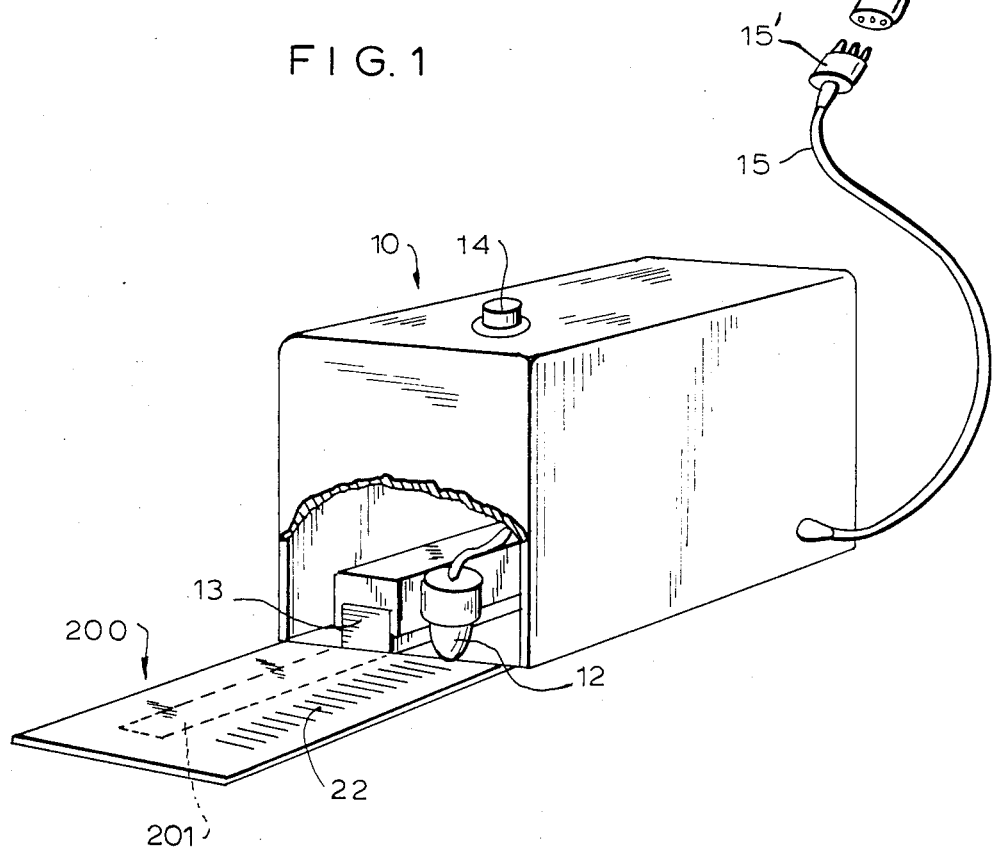

FIG. 1 illustrates schematically an arrangement 10 for activating and/or deactivating a marker strip having a magnetizable layer by means of an arrangement 13 which produces an electromagnetic field. This arrangement is constructed so as to be portable and includes in addition to the device 13 for producing the magnetic field an optical-electronic device 12 for reading an especially coded readable indicia 24 respectively recognizing a specially coded message 22. By means of an electrical wire connection 15, 15' the device 10 is operatively connected to a cash register terminal 100 which is illustrated schematically.

Figure 2:
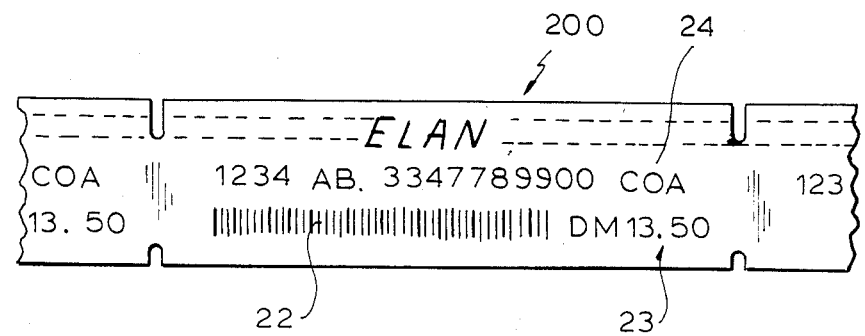
FIG. 2 is a plan view of the marker strip in accordance with the invention.

At the cashier's station the device 10 is placed on the marker strip 200 in such a way that the optical-electronic device 12 reads a specially coded message or coding which has been affixed on the outer surface of the marker strip 200 in visible indicia, respectively coding 22, 24 (FIGS. 1, 2). By constructionally unifying the optical electronic device 12 with the electromagnetic field producing device 13 in a common housing both of them arrive automatically over the region of the marker strip 200 in which the non-visible magnetizable layer 201 is also disposed. By normally actuating the switch 14 there is first of all started a reading process. During this process means which have not been illustrated in the schematic drawing of FIG. 1, for example a small electro motor or simply by moving the strip or housing manually, the optical-electronic device 12 is moved mechanically or manually relative to the "parallel line coding 22" and thereby this coding is read and transformed into electrical pulses which are transmitted via the electrical connection 15, 15' to arrive at the cash register 100 or at a non-illustrated computer. The optical electronic device 12 reading the "parallel line coding" or actual readable coding data is a device that, for example, is a conventional reading head.

After the reading process has been terminated the device 13 is actuated for deactivating the marker strip 200 which has as a consequence that the originally imparted magnetized condition is changed in such a way that the magnetized layer can no longer release an alarm. This can, for example, be effected in that the device 13 (which in its simplest case can be coil through which an alternate current flows) produces for a short period of time an electro-magnetic field that acts on the magnetizable layer 201 of the marker strip 200 to deactivate it. The deactivation of the marker strip 200 dispenses with the need of removing the strip from the purchased and properly paid merchandise.

The design of the arrangement as an easily portable device makes it possible to inexpensively carry out this process at the cashier's station.

Figure 3:
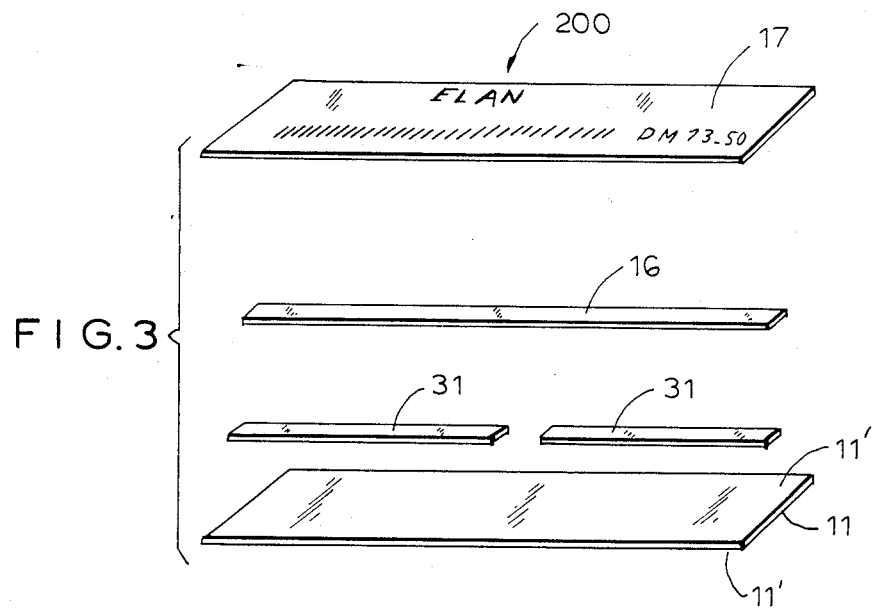
FIG. 3 is a schematic explosive perspective view of a marker strip in accordance with this invention.

For particular applications, for example for use in a library, it is advantageous to activate again the marker strip 200 which is in a book after the loaned book has been returned to the library. This can be achieved without any difficulty in that the magnetizable condition of the marker strip can be changed virtually an infinite number of times. The afore-described arrangement of the invention can also be used for the renewed activation of the marker strip 200. In this case, however, the device 13 produces a magnetic alternate field with higher frequency as was the case with the deactivation process. The constructional details of a marker strip 200 which coacts with the arrangement hereinabove described will be shortly described in conjunction with FIG. 3 which is an explosive view of the components of the marker strip 200. This marker strip 200 includes, first of all, a siliconized carrier band 11 on the upper and lower surfaces of which double-stick adhesive foils 11' are disposed. The adhesive foils 11' can be used, after peeling off the silicon paper, for securing the marker strip 200 on any product. There are mounted on the adhesive foil 11' strips 31 made out of hard magnetic material and strips 16 made out of soft magnetic material which are finally covered by a cover foil 17 made out of paper or synthetic material which constitutes the exterior upper surface of the strip. This cover foil 17 supports or has imprinted thereon, as has been described hereinabove, additional printed indicia.

FIG. 2 illustrates a plan view of a marker strip 200 which has been found to be particularly practical. This figure illustrates the kind of printed indicia that is affixed on the upper foil 17. This indicia includes indication of the type and price group of the merchandise that is to be protected by the marker strip. This indicia can be in readable form 24 and/or in form of vertical parallel lines, which is the form widely used for the automatic recognition of suitable line coding 22 (laser reasing). The afore-described marker strip fulfills simultaneously several functions. First of all, it secures the merchandise from being pilfered and produces thereby the losses incurred due to shoplifting. It also permits a preponderantly automatic recognition of price and/or condition of merchandise at the cashier's station or during taking of inventory. The marker strip permits a particularly economical development of the sales operation, since at a properly equipped cashier station the issuance of the printed sales receipt is carried out substantially simultaneously with the reading of the price of the merchandise and the deactivation process of the marker strip. The deactivation process removes the alarm-releasing properties of the marker strip 200 after the correct payment of the sales price, so that the honest customer can leave the interrogation zone in an unhindered manner.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. A portable device for activating and/or deactivating a magnetizable layer which forms part of a marker strip of an anti-shoplifting system, comprising
   means for producing an electro-magnetic activating or deactivating field;
   electro-optical reading means for reading a readable or pictorial coding on said marker strip;
   means for preventing production of said activating or deactivating field until said electro-optical reading means has read said readable or pictorial coating on said marker strip;
   said electro-magnetic field producing means and electro-optical reading means being mounted in a common portable housing.

2. The portable device for activating and/or deactivating a magnetizable layer as set forth in claim 1, including an electrically operable cashier's register, and an electrical connection for connecting said electro-magnetic field producing means and electro-optical reading means to said cashier's register.

3. The portable device for activating and/or deactivating a magnetizable layer as set forth in claim 2, including manual switching means mounted on said common portable housing and operatively connected to said electro-optical reading means and to said electro-magnetic field producing means for manually activating or deactivating these means.

4. A marker strip for use with a portable antishoplifting device for deactivating and/or activating the marker strip, comprising in combination,
   a carrier strip portion;
   double-stick adhesive foils mounted on opposite sides of the carrier strip portion;
   two superimposed magnetizable strip portions, one of which is made of hard magnetic material and the other one of which is made of soft magnetic material; and
   a cover strip portion having readable and/or pictorial indicia imprinted thereon,
   said foils and strip portions being joined together to from the marker strip.

* * * * *